(12) United States Patent
Almutairi

(10) Patent No.: US 8,603,558 B1
(45) Date of Patent: Dec. 10, 2013

(54) WASTE FOOD RECYCLING MACHINE

(71) Applicant: Jarrah Ali Abdullah Ali Jaddan Almutairi, Aljahra (KW)

(72) Inventor: Jarrah Ali Abdullah Ali Jaddan Almutairi, Aljahra (KW)

( * ) Notice: Subject to any disclaimer, the term of this patent is extended or adjusted under 35 U.S.C. 154(b) by 0 days.

(21) Appl. No.: 13/851,919

(22) Filed: Mar. 27, 2013

(51) Int. Cl.
*A23L 3/16* (2006.01)

(52) U.S. Cl.
USPC ............ 426/233; 426/72; 426/74; 426/392; 426/388; 426/390; 426/510; 426/511; 426/518; 426/519; 426/521; 99/326; 99/338; 99/470; 99/471; 99/474; 99/479; 99/483

(58) Field of Classification Search
USPC ............ 426/231, 233, 72–74, 392, 388, 390, 426/443, 465, 510–511, 518–519, 521, 524, 426/810; 99/325–326, 337–338, 352–353, 99/426–427, 443 R, 470–471, 473–479, 99/483
See application file for complete search history.

(56) References Cited

U.S. PATENT DOCUMENTS

| | | | | |
|---|---|---|---|---|
| 2,165,721 A * | 7/1939 | Norman | .................. | 426/511 |
| 2,595,181 A * | 4/1952 | Vincent | .................. | 426/9 |
| 2,622,029 A * | 12/1952 | Torr | .................. | 426/518 |
| 3,527,642 A * | 9/1970 | Cochrane et al. | .................. | 426/635 |
| 3,649,292 A * | 3/1972 | Quame | .................. | 426/49 |
| 3,971,306 A * | 7/1976 | Wiese et al. | .................. | 99/348 |
| 3,971,851 A * | 7/1976 | Otto | .................. | 426/646 |
| 4,234,537 A * | 11/1980 | Hersom et al. | .................. | 422/26 |
| 4,927,653 A * | 5/1990 | Manvell | .................. | 426/399 |
| 5,346,714 A * | 9/1994 | Peters | .................. | 426/465 |
| 5,644,997 A | 7/1997 | Martin et al. | | |
| 5,702,746 A * | 12/1997 | Wiik | .................. | 426/248 |
| 5,792,498 A * | 8/1998 | Palaniappan et al. | .................. | 426/520 |
| 5,976,594 A * | 11/1999 | LaFollette | .................. | 426/285 |
| 6,534,105 B2 * | 3/2003 | Kartchner | .................. | 426/241 |
| 7,575,771 B2 * | 8/2009 | Ciantar et al. | .................. | 426/480 |
| 8,383,186 B2 * | 2/2013 | Sample | .................. | 426/616 |
| 2007/0184175 A1 | 8/2007 | Rubio et al. | | |

FOREIGN PATENT DOCUMENTS

| | | |
|---|---|---|
| CN | 102511651 A | 6/2012 |
| JP | 2009-082764 | 4/2009 |
| JP | 2009-254341 | 11/2009 |
| WO | WO 2010/114182 A1 | 10/2010 |

* cited by examiner

*Primary Examiner* — Drew E Becker
(74) *Attorney, Agent, or Firm* — Richard C. Litman

(57) ABSTRACT

The waste food recycling machine includes an elongate, vertical housing divided into three stages. In the first stage, waste food is collected and sanitized by steam. After sanitation, the sanitized waste food passes into the second stage where the sanitized waste food is cut into smaller portions and dried. In the third stage, the dried waste food is cooled and mixed. An optional supplement infuser is provided to add additional nutrients. The final mixture is then packaged and further processed.

17 Claims, 2 Drawing Sheets

US 8,603,558 B1

WASTE FOOD RECYCLING MACHINE

BACKGROUND OF THE INVENTION

1. Field of the Invention

The present invention relates to food processing systems, and particularly to a waste food recycling machine that produces edible food from food scraps in a device with a relatively small footprint, thereby maximizing available food for consumption.

2. Description of the Related Art

Consumable food is a relatively abundant resource. Select countries annually produce enough food that can feed the world several times over. Ironically, many regions still experience potential starvation. This unfortunate condition arises from many factors such as economics, political climate, distribution and terrain. Impoverished countries may lack the infrastructure and finances to keep their residents fed. Some areas of the world may not have the roads to deliver food or arable land for raising foodstuffs.

Additionally, a significant portion of produced food ends up as waste. For example, studies in the United States have shown that about a quarter of the farmed food is discarded. Some may be due to poor quality not suitable for sale, and some may be recycled as feed for livestock and other animals. Still a majority are left as waste.

Food waste also gives rise to additional problems, especially in the more developed areas of the world. In more urban areas, food wastes can account for about 30% of the total garbage disposed in landfills. These food wastes break down in these oxygen-free environments, producing methane. Methane has a warming effect several times greater than carbon dioxide.

Some solutions exist for recycling or reusing food scraps. A common solution is to utilize the food waste as compost, which provides a nutrient rich environment for growing produce. However, that requires a concerted effort from participating communities and support infrastructure for handling collection and processing of the wastes to be effective. Moreover, impoverished regions may not have the capability of growing their own crops, even with the assistance of ready-made compost.

Another solution involves industrial recycling of food scraps. However, these tend to involve relatively large, separate components laid out in separate areas for processing the food scraps. This requires occupation of a relatively large amount of space and high financial investment, which may not be feasible in some regions.

In light of the above, it would be a benefit in the art of food processing systems to provide a machine that integrates components and functions for processing food scraps and wastes into consumable food product with minimal space requirements. Thus, a waste food recycling machine solving the aforementioned problems is desired.

SUMMARY OF THE INVENTION

The waste food recycling machine includes an elongate, vertical housing divided into three stages. In the first stage, waste food is collected and sanitized by steam. After sanitation, the sanitized waste food passes into the second stage, where the sanitized waste food is cut into smaller portions and dried. In the third stage, the dried waste food is cooled and mixed. An optional supplement infuser is provided to add additional nutrients. The final mixture is then packaged and further processed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
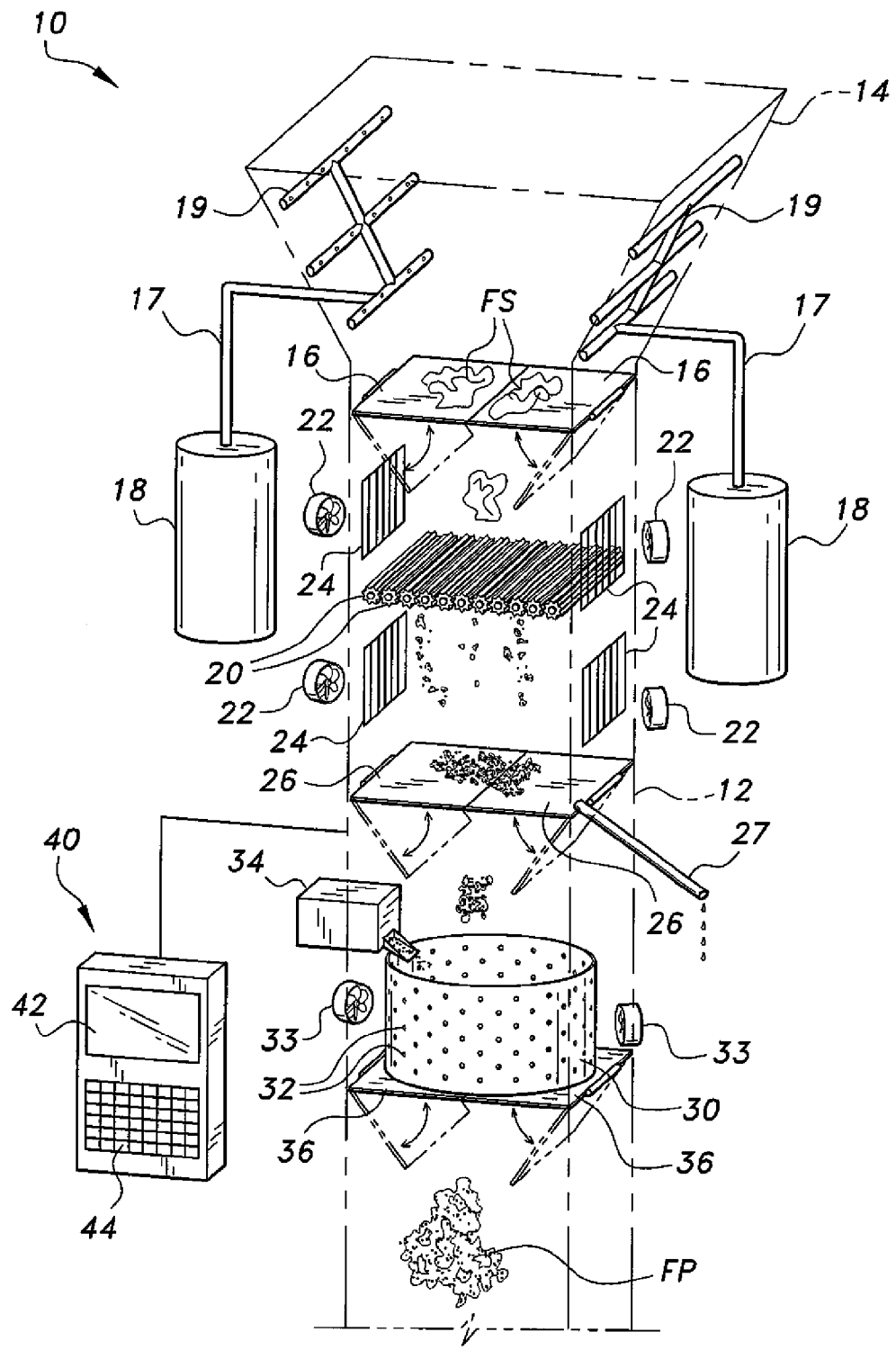
FIG. 1 is an exploded perspective view of a waste food recycling machine according to the present invention.

The waste food recycling machine, generally referred to by the reference number 10 in the drawings, provides a single processing device for recycling food scraps/wastes in a relatively small amount of space. As shown in FIG. 1, the waste food recycling machine 10 includes an elongate vertical housing 12 enclosing several sections where food scraps or food wastes are subject to specific processes.

From the top, the first section or stage of the waste food recycling machine 10 includes a chute section 14 of the housing 12. The chute section 14 collects food scraps or food waste FS, which are temporarily held therein by a first gate or trap door 16 disposed at the bottom of the first section. In this first section, the collected waste food FS is sterilized, sanitized or disinfected by various means. The first section includes a steam frame 19 disposed on opposing sides of the chute section 14. The steam frame 19 can be constructed from hollow pipes having a plurality of holes for expelling steam. The steam frame 19 is connected to a steam source 18 by a steam line 17. When the desired or predetermined amount waste food FS has been collected within the chute section 14, the waste food FS is subjected to a steam bath or spray through the steam frame 19 for a predetermined period of time. The temperature of the steam and the steam exposure time can be varied based upon the composition of the food scraps FS being sanitized. As an alternative, the waste food FS can also be subject to other sterilizing means, such as extended exposure to microwaves or ultraviolet light.

Once the collected waste food FS has been sanitized, the first gate 16 is opened to transfer the sanitized waste food FS to the second section or stage via gravity. In the second section, the sanitized waste food FS falls through a plurality of cutters 20 for comminuting the food scraps 20 into small, even pieces. The cutters 20 may be a row of rotating spur cutters. However, any other similar types of cutters, such as cooperating helical and disc cutters, can also be used. The bottom of the second section is selectively closed by a second gate 26. This allows a given amount of cut waste food FS to be collected for further processing.

In addition to cutting, the second section also dries the waste food FS. To facilitate drying, the second section includes a plurality of drying fans 22 disposed around the second section of the housing 12. Additionally, a plurality of heating elements 24 are placed on the housing 12 in correlation with the respective drying fans 22. Thus, operation of the drying fans 22 forces ambient air through the heating elements 24, which consequently circulates heated air through the second section of the housing 12. Any excess moisture can be drained through a moisture drain pipe 27 extending outwardly from the second section of the housing 12.

Once the cut waste food FS have been dried, the second gate 26 is opened to allow the dried waste food FS to fall into a mixing bin or drum 30 disposed in the third section or stage of the housing 12. Here, the relatively hot, cut waste food FS is exposed to air and allowed to cool by a combination of the mixing action within the mixing drum 30 and positive airflow. To facilitate cooling via positive airflow, the third section includes a plurality holes or perforations 32 in the mixing drum 30, and a plurality of cooling fans 33 are disposed around the third section of the housing 12. Thus, operation of the cooling fans 33 forces air to circulate through the holes 32 in the mixing drum 30. In order to insure that the cut and cooled waste food FS contains sufficient or desired nutrients, the third section also includes a supplement infuser 34 attached to a side of the housing 12. The supplement infuser 34 contains dietary supplements that can be selectively added to the cooling waste food FS and mixed by the mixing drum 30. This food mixture can be realized by a mixing paddle (not shown) within the mixing drum 30, or by simple rotation of the mixing drum 30. The mixing drum 30 is preferably open at the bottom. The bottom of the mixing drum 30 is covered by a third gate or trap door 36. When the desired mixture has been obtained, the food product FP is allowed to fall through the third gate 36, where the food product FP is packaged and further processed.

All the operations of the waste food recycling machine 10 can be fully automated by a control 40 operatively connected to the housing 12. The control 40 can include a visual display 42 and/or user input keys or keypad 44. The display 42, while displaying data on the operations of the waste food recycling device 10, can also be a touch-sensitive screen through which the user can input other commands and functions. With the control 40, the user can define operational parameters, such as steam temperature, duration of steam exposure, drying temperature and duration, mixture coefficients and the like.

Figure 2:
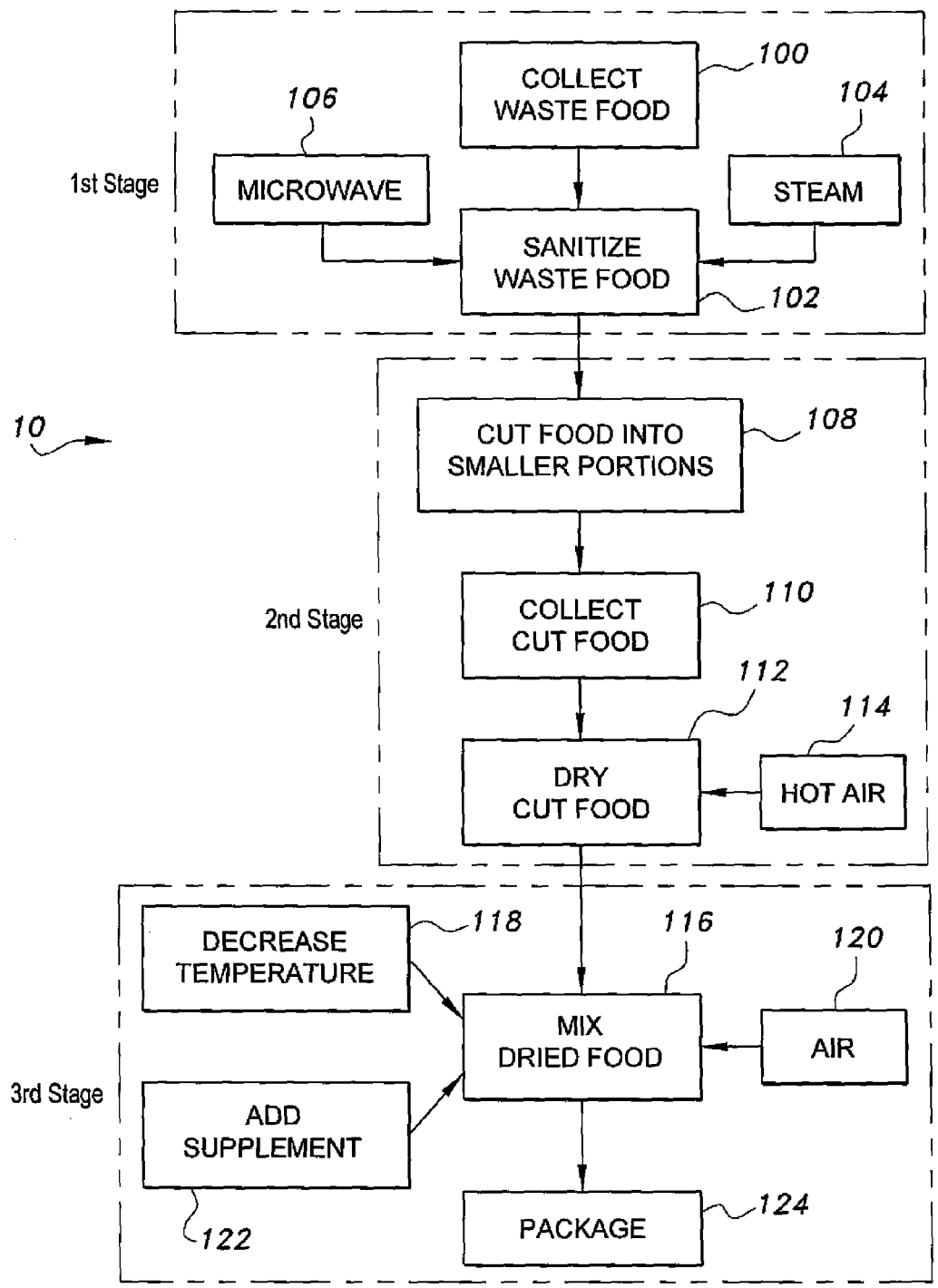
FIG. 2 is a flowchart illustrating the steps for processing waste food through the waste food recycling machine of FIG. 1.

Turning to FIG. 2, the flowchart exemplarily shows the operation of the waste food recycling machine 10. The process is divided into three stages. In the first stage, recycling of food wastes or scraps FS begins by the step of collecting waste food FS 100 within the chute section 14. The waste food FS is then subject to a sanitation step 102. The sanitation is preferably facilitated by steam 104. However, other sanitation processes, such as microwave 106, can be used in conjunction with or separate from steam 104.

In the second stage, the sanitized food scraps FS are cut into smaller portions at step 108 by the cutters 20. The cut food scraps FS are then collected and dried at steps 110 and 112. The drying is accomplished by the use of hot air 114 facilitated by the drying fans 22 and the respective heating elements 24.

In the third stage, the dried and cut food scraps FS are mixed and cooled as at steps 116 and 118. The dried food scraps FS are collected in the perforated mixing drum 30 and cooled by forced air from cooling fans 33. Additional dietary supplements can be added as at step 122 with the use of the supplement infuser 34. When the desired mixture has been obtained, the mixture is allowed to fall through the third gate 36 to be packaged as at step 124.

It is to be understood that the present invention is not limited to the embodiments described above, but encompasses any and all embodiments within the scope of the following claims.

I claim:

1. A waste food recycling machine, comprising:
an elongate, vertical housing having a sequential first section, a second section, and a third section from top to bottom;
a chute forming the first section, the chute directing and collecting waste food for recycling;
means for sanitizing waste food, the means for sanitizing being disposed in the first section;
means for selectively holding and transferring sanitized waste food from the first section to the second section;
to a means for cutting sanitized waste food into smaller portions, the means for cutting being operatively disposed inside the second section;
means for drying the sanitized waste food in the second section of the housing, the means for drying being connected to the second section;
means for selectively holding and transferring dried and cut sanitized waste food from the second section to the third section;
means for mixing the dried and cut, sanitized waste food into a food product, the means for mixing being disposed inside the third section;
means for cooling the dried, sanitized waste food operatively attached to the third section; and
means for selectively holding and transferring the food product from the third section to package processing.

2. The waste food recycling machine according to claim 1, wherein said means for sanitizing waste food comprises at least one steam frame attached to said chute, the at least one steam frame directing steam at collected waste food, at least one source of steam and a steam line connecting said at least one source of steam to said at least one steam frame, selective exposure of said waste food to steam over a period of time sanitizing said waste food.

3. The waste food recycling machine according to claim 2, wherein said means for selectively holding and transferring sanitized waste food from the first section to the second section comprises a first gate operatively disposed at a bottom of said first section, said first gate being selectively opened permitting the sanitized waste food to fall into the second section and selectively closed to hold waste food for sanitation.

4. The waste food recycling machine according to claim 1, wherein said means for cutting sanitized waste food into smaller portions comprises a plurality of cutters disposed in a row inside said second section, said plurality of cutters cutting sanitized waste food as said sanitized waste food passes through said row.

5. The waste food recycling machine according to claim 4, wherein said means for drying the sanitized waste food disposed on the second section of the housing comprises a plurality of heating elements mounted to the second section and a plurality of drying fans mounted around the second section, each fan being operatively associated with each heating element so as to produce heated air by blowing ambient air through the associate heating element, the heated air being circulated through inside said second section thereby drying said sanitized waste food.

6. The waste food recycling machine according to claim 5, wherein said means selectively holding and transferring dried and cut sanitized waste food from the second section to the third section comprises a second gate operatively disposed at a bottom of said second section, said second gate being selectively opened permitting said dried and cut sanitized waste food to fall into the third section and selectively closed to hold cut, sanitized waste food for drying.

7. The waste food recycling machine according to claim 1, wherein said means for mixing the dried and cut, sanitized waste food into a food product comprises a mixing drum having a plurality of holes.

8. The waste food recycling machine according to claim 7, wherein said means for cooling the dried and cut, sanitized waste food comprises a plurality of cooling fans mounted around said mixing drum, said cooling fans forcing and circulating air through said holes in said mixing drum.

9. The waste food recycling machine according to claim 8, further comprising a supplement infuser attached to said third section, said supplement infuser selectively operable for introducing supplemental nutrients into said mixing drum.

10. The waste food recycling machine according to claim 8, wherein said means for selectively holding and transferring said food product from the third section to package processing comprises a third gate operatively disposed at a bottom of said third section, said third gate being selectively opened permitting said food product to fall into package processing and selectively closed to hold said cooling dried and cut, sanitized waste food for mixing.

11. The waste food recycling machine according to claim 1, further comprising a control for automatic operation of said waste food recycling machine, said control being operatively attached to said housing, said control having at least one screen and a keypad.

12. A waste food recycling machine, comprising:
an elongate, vertical housing having a sequential first section, a section, and a third section from top to bottom;
a chute formed on the first section, the chute directing and collecting waste food for recycling;
a steam sprayer disposed on the first section, the steam sprayer sanitizing waste food collected in the chute;
a first gate operatively disposed at a bottom of the first section, the first gate selectively holding and transferring sanitized waste food from the first section to the second section;
a plurality of cutters arranged in a horizontal row inside the second section, the cutters cutting sanitized waste food into smaller portions as the sanitized food falls through the cutters;
a drier connected to the second section, the drier circulating hot air to dry the sanitized waste food in the second section of the housing;
a second gate operatively disposed at a bottom of the second section, the second gate selectively holding and transferring dried and cut sanitized waste food from the second section to the third section;
a mixing drum mounted inside the third section, the mixing drum having a plurality of holes, the mixing drum mixing the cut, dried and sanitized waste food into a food product;
a cooler operatively connected to the third section, the cooler cooling the cut, dried and sanitized waste food inside the mixing drum; and
a third gate operatively disposed at a bottom of the third section, the third gate selectively holding and transferring the food product from the third section to package processing.

13. The waste food recycling machine according to claim 12, further comprising a supplement infuser attached to said third section, said supplement infuser selectively operable for introducing supplemental nutrients into said mixing drum.

14. The waste food recycling machine according to claim 12, further comprising a control for automatic operation of said waste food recycling machine, said control being operatively attached to said housing, said control having at least one screen and a keypad.

15. A process of recycling waste food, comprising the steps of:
providing a waste food recycling machine having:
an elongate, vertical housing having a sequential first section, a section, and a third section from top to bottom;
a chute formed on the first section, the chute directing and collecting waste food for recycling;
a means for sanitizing waste food, the means for sanitizing being disposed on the first section;
a means for selectively holding and transferring sanitized waste food from the first section to the second section;
a means for cutting sanitized waste food into smaller portions, the means for cutting being operatively disposed inside the second section;
a means for drying the sanitized waste food in the second section of the housing, the means for drying being connected to the second section;
a means for selectively holding and transferring dried and cut sanitized waste food from the second section to the third section;
a means for mixing the dried and cut, sanitized waste food into a food product, the means for mixing being disposed inside the third section;
a means for cooling the dried, sanitized waste food operatively attached to the third section; and
a means for selectively holding and transferring the food product from the third section to package processing,
collecting waste food for recycling inside the chute;
sanitizing the waste food inside the chute;
transferring the sanitized waste food from the first section into the second section;
cutting the sanitized waste food into smaller portions by passing the sanitized waste food through the means for cutting;
drying the cut, sanitized waste food with the means for drying;
transferring the cut, dried and sanitized waste food from the second section into the third section;
mixing the cut, dried and sanitized waste food into a food product with the means for mixing;
cooling the cut, dried and sanitized waste food; and
transferring the cooled food product for packaging.

16. The process for recycling waste food according to claim 15, further comprising the steps of providing a supplement infuser attached to said third section; and introducing supplemental nutrients into said means for mixing with said supplement infuser.

17. The waste food recycling machine according to claim 15, further comprising the step of providing a control for automatic operation of said waste food recycling machine, said control having at least one screen and a keypad.

* * * * *